United States Patent

[11] 3,622,319

[72] Inventor Donald Jex Sharp
Princeton, N.J.

[21] Appl. No. 593,610
[22] Filed Oct. 20, 1966
[45] Patented Nov. 23, 1971
[73] Assignee Western Electric Company, Incorporated
New York, N.Y.

[54] NONREFLECTING PHOTOMASKS AND METHODS OF MAKING SAME
1 Claim, 9 Drawing Figs.

[52] U.S. Cl. 96/27, 96/36, 96/36.2, 156/7, 156/13
[51] Int. Cl. G03c 5/04
[50] Field of Search 204/15; 156/7, 8, 13, 16; 96/36, 36.2, 27; 117/211, 212

[56] References Cited

UNITED STATES PATENTS

| | | | |
|---|---|---|---|
| 2,995,473 | 8/1961 | Levi | 117/211 X |
| 3,035,990 | 5/1962 | Davis et al. | 204/15 |
| 3,135,638 | 6/1964 | Cheney et al. | 90/36.2 X |
| 3,197,391 | 6/1965 | Bowers | 156/13 X |
| 3,294,653 | 12/1966 | Keller et al. | 156/13 X |
| 3,361,662 | 1/1968 | Sutch | 156/7 X |

OTHER REFERENCES

Kaplan, " Pattern Formation by Aluminum Anodization" May 1965, IBM Tech. Discl. Bul. Vol. 7, No. 12 pp. 1120

*Primary Examiner*—George F. Lesmes
*Assistant Examiner*—R. E. Martin
*Attorneys*—H. J. Winegar, R. P. Miller and W. M. Kain

ABSTRACT: A nonreflecting photomask comprises a pattern of an anodized, film-forming material on a transparent substrate. The thickness of the anodic oxide is chosen such that when the mask is employed in selectively exposing a photoresist-coated body to light (by placing the oxide against the photoresist), destructive interference prevents light reflected from the body to the oxide from being re-reflected to the photoresist. Thus, undesirable exposure of masked portions of the photoresist is precluded.

INVENTOR
D. J. SHARP
BY [signature]
ATTORNEY

NONREFLECTING PHOTOMASKS AND METHODS OF MAKING SAME

This invention relates generally to photolithographic pattern generation. More particularly, this invention relates to photomasks for use in such pattern generation and to methods of making the photomasks. Accordingly, the general objects of this invention are to provide new and improved photomasks and methods of manufacture of such character.

In the manufacture of miniature electronic components and circuits, such as semiconductor devices and thin-film circuits, one of the most important processes is the photolithographic generation of a desired device or circuit configuration. In fact, in most cases, the accuracy with which this process can be performed, is the prime controlling factor governing the degree of miniaturization attainable.

Generally, the photolithographic pattern generation is accomplished by coating a body, upon which it is desired to form a pattern, with a photoresist material. Next, the photoresist coated body is exposed to light through a photomask, placed in contact with the body and having an opaque material thereon patterned in a configuration corresponding to a positive or negative of the pattern it is desired to form. The photoresist is then developed to either remove the unexposed or the exposed portions thereof, depending upon whether a negative or positive photoresist is employed. Typically, the body is then etched to form the desired pattern.

One of the problems attendant this process is that, because of the small absorptivity of the photoresists normally employed, particularly for very thin coatings thereof, the incident light passes through the coating and is reflected from the body. If the incident light is not perfectly normal to the surface of the photoresist, or if it is diffracted upon passage through the transparent "windows" of the mask, the incident light is reflected angularly from the surface of the body rather than normally therefrom. As a result, the reflected light, instead of passing back out through the windows, impinges upon the opaque portions of the mask. If the opaque portions are reflective, this causes multiple reflections between the opaque portions and the surface of the body, thereby exposing the photoresist in portions which should remain unexposed. This, in turn, results in poor pattern definition.

Another problem encountered in using photomasks is deterioration of the masks during use. This is due to the fact that, in order to assure accurate reproduction, the exposure step is effected by a contact printing technique wherein the mask is placed, pattern side down, in intimate contact with the photoresist. The effect of this step, particularly with masks wherein the pattern is formed from a photoemulsion, is abrasion or wear of the mask pattern, causing poor pattern reproduction and necessitating frequent replacement of the masks. In an attempt to increase the durability of the masks, masks having patterns formed of a metal, such as chromium, have been employed. While masks of this type have met with some success, they have not been found to be entirely satisfactory when used with bodies having an irregular topology, such as epitaxial semiconductor devices.

Accordingly, it is an object of this invention to provide new and improved photomasks which are nonreflecting and extremely durable and abrasion-resistant. It is a related object of this invention to provide new and improved methods of fabricating photomasks having such characteristics, which methods enable the formation of very intricate, precise and minute mask patterns.

In accordance with certain principles of the invention, a photomask for exposing to light selected portions of a photosensitive layer secured to a supporting body, may include a pattern of a film-forming material, opaque to the light, secured on a substrate which is transparent to the light. An oxide of the film-forming material is formed on the pattern to provide a tough, durable and abrasion-resistant covering for the pattern. Preferably, the thickness of the oxide is selected such that, in use, when the mask is placed, oxide side down, in intimate contact with the layer, and light is directed onto the mask to expose the selected portions of the layer, reflections of light impinging on the oxide from the supporting body are substantially minimized by destructive interference.

The photomask may be fabricated by depositing the film-forming material through a metal mask, apertured in a configuration corresponding to the desired mask pattern. Alternatively, the photomask may be fabricated by area film deposition, followed by resist masking, as by photolithography, and etching. However, as disclosed in the copending application of D. J. Sharp, entitled "Patterning of Film-Forming Materials," Ser. No. 588,152, now abandoned and filed on even date herewith, the first technique has been found to be disadvantageous in several respects: (1) the metal masks must be frequently cleaned to prevent a buildup of the deposited material; (2) separate metal masks must be maintained for each different photomask to be fabricated; (3) the metal masks are difficult to handle; and (4) it is difficult to fabricate metal masks with intricate or highly detailed patterns. The second technique, while generally successful in overcoming these disadvantages, has not been found to be satisfactory in forming very minute and intricate patterns (e.g., line widths and interlinear spacings of the order of 2 microns), because of the deterioration during etching of the very thin photoresist coatings necessary to form such patterns.

The foregoing shortcomings are obviated, in accordance with certain principles of the invention, by a method of fabrication which includes depositing a layer of a film-forming material on a transparent substrate and oxidizing selective portions of the layer to form a pattern of an oxide of the film-forming material on the layer. All of the unoxidized film-forming material is then removed from the substrate by etching the material with an etchant that attacks the film-forming material but does not attack the oxide pattern. Preferably, the selective oxidization is accomplished by first forming photolithographically a resist pattern on the substrate having a configuration corresponding to a negative of the desired pattern. The material is then anodized through the resist pattern to form an anodic-oxide pattern, after which it is etched through the anodic-oxide pattern.

This technique permits very intricate, precise and minute mask patterns to be formed because of the fact that the electrolytes used in anodization are relatively weak and, accordingly, do not cause any lifting-up or deterioration of the resist, even where very thin coatings thereof are employed. Anodic-oxides of film-forming materials, on the other hand, are very tough and durable and are attached to their base material with extremely strong bonds. Accordingly, during etching the anodic-oxide pattern retains its integrity, notwithstanding the use of an etchant which would destroy a corresponding resist pattern. The invention, as well as its objects, advantages and features will be more readily understood from the following detailed description, when considered in conjunction with the appended drawings, in which:

Figures 1, 2, 3, 4, 5, 6, 7, 8, 9:
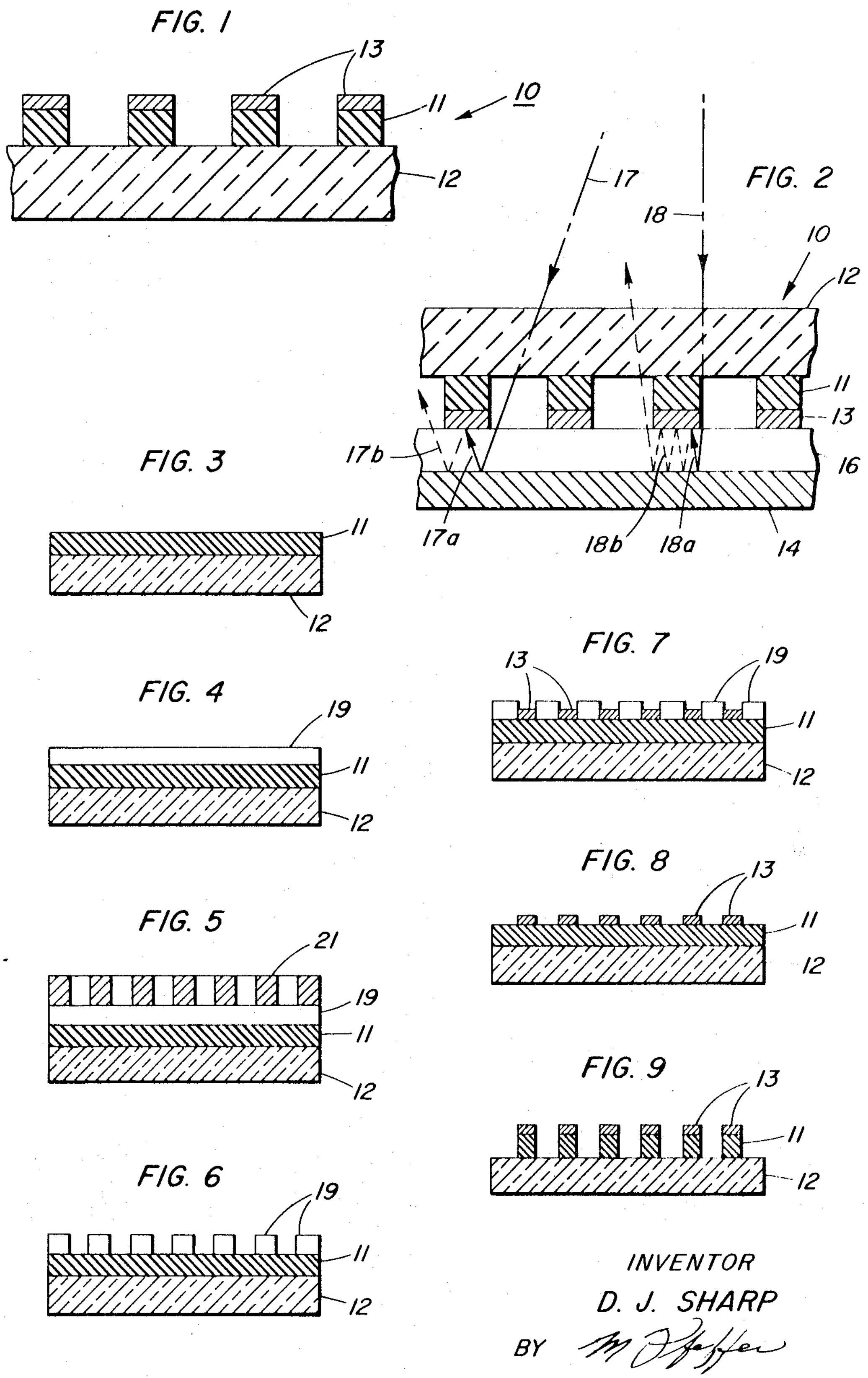
FIG. 1 is a fragmentary, sectional view of a photomask illustrating certain principles of the inventions.
FIG. 2 is a fragmentary, sectional view showing how the photomask of FIG. 1 is used to expose selected portions of a photosensitive body to light.
FIGS. 3 to 9 are a series of sectional views illustrating various steps in an illustrative embodiment of a method of fabricating the mask of FIG. 1, in accordance with certain principles of the invention.

It should be understood that the dimensions in the drawings are greatly exaggerated for the sake of clarity of illustration.

PHOTOMASK CONSTRUCTION

Referring now to the drawings and particularly to FIG. 1, there is shown a photomask 10 illustrating certain principles of the invention. The photomask 10 includes a pattern of a film-forming material 11 formed on a substrate 12 and an oxide 13 of the film-forming material formed on the pattern.

The substrate material is chosen such as to be transparent to the light to be employed with the photomask 10. For example, if the light to be employed is in the ultraviolet range, the substrate may be composed of glass or quartz.

Similarly, the selection of a film-forming material film-forming metal depends upon the light to be employed with the photomask 10. Thus, the film-forming material 11 should be opaque to the light and should have an oxide 13 which is transparent thereto. For use with ultraviolet light, for example, any of the film-forming materials, such as tantalum, niobium, aluminum, titanium, hafnium and the like would be generally suitable.

As will be explained in more detail below, the thickness of the oxide 13, in accordance with certain principles of the invention, is made such that, in use, reflections of light impinging thereon are substantially minimized by destructive interference.

USE

Referring now to FIG. 2, there is shown a body 14 having a photosensitive coating 16 thereon which is to be exposed to light through the photomask 10. The photomask 10 is placed, oxide side down, in intimate contact with the coating 16. Light from a suitable source (not shown) is then directed onto the photomask 10 to expose those portions of the coating 16 not covered by the oxidized, film-forming material pattern.

The wavelength of the light is selected in accordance with the spectral sensitivity of the coating 16. For example, if the coating 16 is composed of one of the family of Kodak photoresists such as: KPR, KMER, KTFR, etc., the light should be ultraviolet light having a wavelength of approximately 3200A.

Additionally, the light should be collimated and should be directed normally onto the photomask 10, in which case any light passing through the coating 16 and reflected from the body 14 will be reflected normally and will pass out through the "window" from which it entered. If, however, the light is not perfectly collimated, or is not directed normally, as represented by the ray 17, or if the light is diffracted upon passage through the photomask 10, as represented by the ray 18, the light will be reflected angularly from the body 14 toward the surface of the pattern. If this reflected light (represented by the rays **17*a* and 18*a*) is allowed to reflect from the surface of the pattern, it will result in multiple reflections (represented by the rays 17*b* and 18*b*) between the pattern surface and the surface of the body, thereby exposing those portions of the coating 16** which are not to be exposed.

This is prevented from occurring, according to certain principles of the invention, by judicious selection of the thickness of the oxide 13, so that the exposure effect of the light reflected from the oxide-coating interface is nullified or substantially minimized by destructive interference. More specifically, as is well known (see, for example, L. Young, *Anodic Oxide Films*, Academic Press, London and New York, 1961) light incident on a transparent oxide is partly reflected and partly refracted into the oxide. Depending upon the index of refraction of the oxide 13 relative to the coating 16, a phase change of a half-wavelength may occur between the reflected light and the incident or refracted light, i.e., a phase change occurs when light is reflected from a medium having a higher index of refraction than that in which the light is traveling. The refracted light is then reflected from the interface between the oxide and the film-forming material back to the surface of the oxide. Since oxides of film-forming materials invariably have smaller indices of refraction than their base materials, a phase change of a half-wavelength occurs between the incident light and the reflected light at the film-forming material-oxide interface. The light reflected from the film-forming material-oxide interface then travels back to the oxide-coating interface, from which it emerges and interferes with the light initially reflected from the oxide-coating interface.

If the interfering light waves are out of phase, destructive interference will result, thereby substantially minimizing the effect of reflections from the oxide-coating interface. The actual phase relationship is dependent upon the oxide thickness. Thus, for example, for normally directed light, if the coating 16 has an index of infraction ($n_1$) which is less than that ($n_2$) of the oxide 13, and the index of refraction of the oxide is less than that ($n_3$) of the material 11 (i.e., $n_1<n_2<n_3$), generally, an oxide thickness of one-quarter wavelength (or any odd multiple thereof) will cause destructive interference between the light initially reflected from the oxide-coating interface and that reflected from the film-forming material-oxide interface. Similarly, if $n_1>n_2<n_3$ an oxide thickness of a half-wavelength (or an odd multiple thereof) will result in destructive interference. Desirably, to maximize the destructive interference, the surface of the oxide and the surface of the film-forming material should have substantially the same reflectivity, as is the case, for example, for tantalum and tantalum pentoxide.

For light which is not normal, as in the present instance, the cancelling thicknesses will deviate from a quarter or a half-wavelength depending upon the incidence angles of the light and the optical constants of the materials involved. The minimizing thickness(es) may be calculated from well-known optical formulae (see Young *supra*, as well as Born and Wolt, *Principles of Optics*, MacMillan New York, 1964, and Kubaschewski and Hopkins, *Oxidation of Metals and Alloys*, Butterworths, London, 1962). Preferably, however, since in the usual case the optical constants involved are not accurately known, the minimizing thicknesses are determined empirically by means of conventional optical measurement techniques. Thus, for example, the reflectivities of a series of differing oxide thicknesses for a particular wavelength may first be determined by spectrophotometry. Next, a graph of reflectivity versus oxide thickness may be constructed from the results of the supra, The minimizing thicknesses may then be determined by noting the points of minimum reflectivity. Using such a technique with a tantalum—tantalum pentoxide system it was determined that a tantalum pentoxide thickness of 450A. was a minimizing thickness at a wavelength of 3200A. In actual use, this thickness was found to result in very satisfactory reflection minimization.

METHOD OF FABRICATION

A method of fabricating the photomask 10, illustrating certain principles of the invention, is illustrated in FIGS. 3 to 9.

Referring now to FIG. 3, the first step in the method is the deposition of a thin layer of the film-forming material 11 on the substrate 12 by conventional cathodic sputtering or vacuum evaporation techniques (see, for example, *Vacuum Deposition of Thin Films*, L. Holland J. Wiley and Sons, 1956). The thickness of the layer is not critical and may, for example, be within the range of 1000A. and 10,000A.

After deposition of the film-forming layer 11, the layer is masked with an anodizing-resist material. Preferably, this masking step is accomplished by a conventional photolithographic technique. In accordance with this technique, the film-forming layer 11 is coated with a layer 19 of a conventional photoresist material, such as Kodak KTFR (FIG. 4). The thickness of the layer 19 is selected such that it is equal to or less than the widths of the lines and interlinear spacings of the mask pattern to be formed. Thus, for example, where the widths of the lines and interlinear spacings are of the order of 2 microns, the thickness of the photoresist layer 19 is of the order of 1 micron or less.

Next, as seen in FIG. 5, selected portions of the photoresist layer 19 are exposed to light by interposing a photomask 21 between the photoresist layer and a source of light (not shown). The layer 19 is then subjected to a conventional development process which dissolves the unexposed portions, forming the structure shown in FIG. 6. As should be apparent in lieu of a negative photoresist (e.g., Kodak KTFR), a positive photoresist, such as Azoplate AZ 1350, sold by the Shipley Co., Newton, Mass., may be used to mask the layer 11, in which case, the development process removes the exposed portions of the resist.

After formation of the resist pattern on the film-forming layer 11, the layer is subjected to a conventional anodizing process, such as that disclosed in U.S. Pat. 3,148,129, issued Sept. 8, 1964 to H. Basseches et al. Illustratively, the anodizing process may be accomplished by immersing the entire substrate in an anodizing electrolyte, such as a dilute aqueous solution of phosphoric acid, and applying a voltage between the layer 11 and a cathode disposed in the electrolyte. The magnitude of the voltage is selected in accordance with the desired thickness of the oxide 13. The magnitude of the voltage, of course, should not be greater than the dielectric breakdown voltage of the resist. As seen in FIG. 7, this results in an anodic-oxide 13 (e.g., tantalum pentoxide where the layer 11 is composed of tantalum) being formed on the unmasked portions of the layer 11. The resist 19, of course, protects its underlying portions of the layer 11 from being anodized. As noted above, because of the relatively gentle action of anodization compared to etching, no impairment of the resist 19 occurs during anodization, whereby the resultant anodic-oxide pattern is a true negative, with sharp edge definition, of the resist pattern.

The resist 19 is then removed with a suitable solvent, resulting in the structure shown in FIG. 8. It should be noted that, where appropriate, the layer 11 could be selectively anodized without prior application of a resist by employing a viscous electrolyte, as disclosed in the copending application of A. J. Harendza-Harinxma, Ser. No. 564,332, filed July 11, 1966, now U.S. Pat. No. 3,445,353, to the assignee of the present application. Alternatively, anodizing apparatus of the capillary type may be employed, as disclosed in the copending application of R. D. Sutch, Ser. No. 346,243, filed Feb. 20, 1964 and also assigned to the assignee of the present application.

The final step in the present method is the etching of the anodic-oxide, masked layer 11 with an etchant which attacks the filming-forming material but does not attack its anodic-oxide 13. Thus, for example, as disclosed in the copending application of J. W. Balde, Ser. No. 409,656, filed Nov. 9, 1964, now U.S. Pat. No. 3,406,043 and assigned to the assignee of the present application, where the layer 11 is composed of tantalum, an etchant comprising nitric and hydroflouric acid may be used for this purpose. The etching step effects the removal of all of the exposed portions of the layer 11, the unexposed portions being protected from attack by their tough, strongly adherent coverings of anodic-oxide 13. The resultant structure is shown in FIG. 9.

It is to be understood that the above-described embodiments are simply illustrative of the principles of the invention. Various other embodiments may be readily devised by those skilled in the art which will embody these principles and fall within the spirit and scope thereof.

What is claimed is:

1. In a method of exposing selectively a photosensitive layer, the improvement comprising:

I. Fabricating a photomask by
   - a. forming on a substrate transparent to light of a predetermined wavelength a pattern of a film-forming metal which is both opaque to and reflects the light;
   - b. forming a layer of an oxide of the film-forming metal on said pattern, which oxide layer is capable of partially reflecting and of partially transmitting and refracting the light and which oxide layer has a thickness which maximizes the destructive interference between said light reflected from said oxide and said light reflected from said film-forming metal; and then II. Exposing the photosensitive layer to said light by
   - c. contacting the photosensitive layer with said oxide layer; and
   - d. exposing said photosensitive layer to said light through said mask.

* * * * *